UNITED STATES PATENT OFFICE.

WILLIAM N. BLAKEMAN, JR., OF NEW YORK, N. Y.

OIL.

No. 883,521.  Specification of Letters Patent.  Patented March 31, 1908.

Application filed March 2, 1907. Serial No. 360,154.

*To all whom it may concern:*

Be it known that I, WILLIAM N. BLAKEMAN, Jr., a citizen of the United States, and resident of the borough of Manhattan, in the city, county, and State of New York, have invented a new and useful Improvement in Oils, which invention is fully set forth in the following specification.

My invention relates to the oil known as tung oil, sometimes called Chinese wood oil, and its object is so to treat tung oil that, when used, either alone or mixed with other oils, as a drier for paints, or as a medium for grinding pigments to paste form, or as a vehicle for grinding pigments to paint form, the result in all cases will be the production of a quick-drying and otherwise satisfactory compound. I accomplish this object by hydrating the tung oil, and this hydration may be effected in several ways. I prefer to place the oil in a vessel suitable for observation with about two per cent. of distilled water distributed on the bottom in as small globules as possible to increase contact area and then subject it to a heat of about 150° Fahr. I use gentle agitation from time to time until all the water has been absorbed by, and chemically combined with the oil, which will take from 10 to 15 hours, the time depending upon the quantity of water, the contact area, and the agitation.

Instead of hydrating the oil by heating it in the presence of water, it may be hydrated by exposing it in shallow vessels, with broad surfaces, to the action of air and light; or by suspending the oil, in a suitable vessel, over a body of water, with a covering arranged to retain a vaporous atmosphere in contact with the oil; or by placing the oil in a vessel having about two per cent. of water distributed on the bottom, and exposing this vessel to light and agitating the oil at intervals, until the water has been combined with the oil. These methods, however, will be found to be very slow and less satisfactory than the method first described, but I wish it to be understood that any suitable method of hydration may be employed.

The tung oil, either before or after hydration, may be oxidized by any suitable method of oxidation, such as by heating it on oxidizers; or by submitting it with heat to the action of pure oxygen under pressure; or by passing through it, with heat, thoroughly dried air; or by incorporating with it any highly oxidized body with which it is miscible, such as boiled linseed oil, manganese resinate, elaidinized oil, and the like.

The tung oil, having been hydrated, is ready for use, and in this condition it will be found to constitute an efficient drier for paints, either alone or mixed with other oils. It may also be used, either alone or mixed with other oils, as a medium for grinding pigments to paste form, or as a vehicle for grinding pigments to paint form. Instead of using the hydrated tung oil alone for any of these purposes, I prefer to combine it with another oil, such as linseed oil. The oil with which the hydrated tung oil is so combined may, if desired, be either oxidized or hydrated by any of the methods above described; or it may be rancidified by exposure to light and air as determined by the Kreis test for rancidity (*Chemiker Zeitung*, 1899, Vol. 23, p. 802): or it may be elaidinized by being subjected to the action of an oxid of nitrogen; or it may be subjected to two or all of these treatments; the result being the production of a quicker-drying compound when combined with the hydrated tung oil.

When my hydrated tung oil is used in any of the ways above described, it will be found to impart spreading power and drying characteristics to all those pigments which ordinarily are deficient in both spreading power and drying qualities when ground in the usual linseed oil vehicle, such as zinc oxid; zinc sulfid; lead carbonate; lead sulfate; lead sulfite; barium sulfate; barium carbonate; calcium carbonate; strontium sulfate; strontium carbonate; the new process white leads of which Matheson lead is an example; and the various combinations of zinc and lead resulting from furnace sublimation and known commercially as sublimed lead, oxysulfate of lead, zinc lead, and other trade names; and a paint-compound produced by grinding one or more of these pigments in conjunction with my hydrated tung oil will be found to be equal in physical respects and superior in chemical results to the usual combination of Dutch white lead and linseed oil. I prefer to use the hydrated tung oil as a medium for grinding the pigment to pasteform; and if, for example, 100 parts of zinc oxid be ground to paste form with 15 per cent. of tung oil hydrated with one per cent. of water, and this paste afterwards extended to paint form, with 90 parts of linseed oil, the paint so produced will, with the usual quantity of commercial liquid drier added, follow the brush in a smooth, homogeneous and uniform film, and dry in about 3¼ hours in clear weather at a temperature of 50° Fahr.

The hydration to be imparted to the tung oil and the proportion of hydrated tung oil to be employed may be varied in practice and will depend largely upon the character of the pigment with which it is to be used. Dense or heavy pigments like the lead salts, will require less hydration than a light or bulky pigment like zinc oxid, and hence, the oil should either be hydrated with a smaller percentage of water or else a smaller percentage of the hydrated oil should be combined with the pigment. My experiments would seem to indicate that not more than five per cent. of water will be required in any case, and from one to two per cent. will be found sufficient for most pigments. This matter can be easily determined in practice by testing the oil with a particular pigment to ascertain if the requisite spreading power and drying qualities are exhibited.

As a result of my method of hydration, the water is chemically combined with the oil, and does not exist as interstitial water, and it can not be evaporated at ordinary temperatures.

I do not claim, in this application, the combination of my hydrated tung oil with a pigment, the same being covered by the claims in my pending applications No. 242,504, filed January 24th, 1905; No. 301,568, filed February 17th, 1906; No. 274,772, filed August 18th, 1905, and Nos. 321,631, 321,633, 321,635, and 321,637 filed June 14th, 1906.

Any suitable commercial or other drier may be used in conjunction with the hydrated tung oil, if desired.

Heat, pressure, and agitation may be employed whenever deemed advisable.

Having thus fully described my invention, I claim:—

1. As a new composition of matter, tung oil having water chemically combined therewith.

2. A compound or mixture of hydrated tung oil, and another oil.

3. A compound or mixture of hydrated tung oil; and another oil, also hydrated.

4. A compound or mixture of hydrated tung oil; another oil; and a drier.

5. A compound or mixture of hydrated tung oil; another oil, also hydrated; and a drier.

WM. N. BLAKEMAN, Jr.

Witnesses:
FRANCIS P. REILLY,
MABEL O. FAHNESTOCK.